(12) United States Patent
Qin

(10) Patent No.: US 9,290,900 B2
(45) Date of Patent: Mar. 22, 2016

(54) OIL-WATER SEPARATING DEVICE AND FLOATING OIL COLLECTING SYSTEM COMPRISING SAME

(75) Inventor: Shengyi Qin, Beijing (CN)

(73) Assignee: BEIJING RECHSAND SCIENCE & TECHNOLOGY GROUP CO., LTD (CN)

( * ) Notice: Subject to any disclaimer, the term of this patent is extended or adjusted under 35 U.S.C. 154(b) by 344 days.

(21) Appl. No.: 13/988,094

(22) PCT Filed: Jun. 21, 2011

(86) PCT No.: PCT/CN2011/076049
§ 371 (c)(1),
(2), (4) Date: Sep. 30, 2013

(87) PCT Pub. No.: WO2012/065439
PCT Pub. Date: May 24, 2012

(65) Prior Publication Data
US 2014/0014565 A1   Jan. 16, 2014

(30) Foreign Application Priority Data
Nov. 19, 2010   (CN) .......................... 2010 1 0554391

(51) Int. Cl.
*E02B 15/10*   (2006.01)
*B01D 17/02*   (2006.01)
(Continued)

(52) U.S. Cl.
CPC .......... *E02B 15/101* (2013.01); *B01D 17/0208* (2013.01); *B01D 17/045* (2013.01); *B01D 17/085* (2013.01); *E02B 15/045* (2013.01); *E02B 15/048* (2013.01); *E02B 15/10* (2013.01); *C02F 1/40* (2013.01); *C02F 2103/007* (2013.01); *C02F 2201/008* (2013.01); *E02B 15/106* (2013.01)

(58) Field of Classification Search
CPC ..... E02B 15/10; E02B 15/045; E02B 15/048; E02B 15/101; E02B 15/106; C02F 1/40; C02F 2101/32; C02F 2103/007; C02F 2201/008; B01D 17/0208; B01D 17/085; B01D 17/045
USPC .................... 210/242.3, 242.4, 693, 923, 924
See application file for complete search history.

(56) References Cited

U.S. PATENT DOCUMENTS 3,667,608 A * 6/1972 Burroughs et al. ........ 210/242.4
3,669,275 A * 6/1972 Downs ....................... 210/242.4
(Continued)

FOREIGN PATENT DOCUMENTS

| CN | 2518565 Y | 10/2002 |
|---|---|---|
| CN | 1765457 A | 5/2006 |

(Continued)

OTHER PUBLICATIONS

International Search Report for corresponding application PCT/CN2011/076049 filed Jun. 21, 2011; Mail date Oct. 13, 2011.

*Primary Examiner* — Matthew O Savage
(74) *Attorney, Agent, or Firm* — Cantor Colburn LLP

(57) ABSTRACT

An oil-water separating device and a floating oil collecting system including an oil gathering chamber enclosed by a wall, where at least a part of the surface of the wall is covered with a porous, oleophilic and hydrophobic layer which allows penetration of water and oil, the device further including a fixed layer covering on the surface of the porous, oleophilic and hydrophobic layer for limiting the flowing of the porous, oleophilic and hydrophobic layer, which allows the penetration of water and oil, where the pore diameter of said porous, oleophilic and hydrophobic layer is 300-850 μm, and the porosity is 10-40%.

10 Claims, 3 Drawing Sheets

(51) Int. Cl.
*B01D 17/00* (2006.01)
*E02B 15/04* (2006.01)
*B01D 17/04* (2006.01)
*C02F 1/40* (2006.01)
*C02F 103/00* (2006.01)

(56) References Cited

U.S. PATENT DOCUMENTS 3,804,661 A * 4/1974 Muntzer et al. ............... 428/403
3,831,756 A * 8/1974 Bhuta et al. .................. 210/109
4,197,204 A * 4/1980 Mathes ...................... 210/242.3
5,971,659 A 10/1999 Patterson
2003/0111400 A1 6/2003 House

FOREIGN PATENT DOCUMENTS

| | | |
|---|---|---|
| CN | 101586024 A | 11/2009 |
| GB | 1442219 A | 7/1976 |
| GB | 1597942 A | 9/1981 |
| WO | 2008058243 A2 | 5/2008 |

* cited by examiner

OIL-WATER SEPARATING DEVICE AND FLOATING OIL COLLECTING SYSTEM COMPRISING SAME

TECHNICAL FIELD

The present invention relates to an oil-water separating device and a floating oil collecting system comprising same.

BACKGROUND ART

The oil around the world is transported mainly by means of marine transportation while serious oil spill accidents will occur due to stranding, impacting, striking a rock and structure damage of the hull itself during the sailing of a tanker. At the meantime, more and more sea drilling platforms and floating pipe lines have been successively established, by which safety problems of environment or of their own structure may exist; this leads to oil spill accidents, results in a large area of floating oil on the sea. Therefore, the negative influences caused by the floating oil will be minimized by effective floating oil recovering methods and advanced floating oil recovering devices.

The current floating oil collecting device that has a function of collecting and processing only works for oil floating on water with smaller area and less amount of liquids, but it is powerless for handling the case in which large quantities of floating oil caused by capsizing or leaking of a large and giant tanker is spreading on a large sea area. For example, current floating oil collectors first suck in floating oil on the water surface and part of water, by a floating oil suction inlet, based on the fact that water and oil have different densities; the oil-water mixture is sent to a vortex type floating oil separator by a reciprocation pump; the oil-water mixture is separated in the separator; the floating oil is accumulated in the separator and discharged automatically; the water that has been separated from floating oil is returned to the sea by a return pipe. For example, CN2122860U has disclosed a floating oil collector mainly consisting of a water pump, an oil pump, a floating body and an open container. This floating oil collector utilizes the difference in local water level, the laminar flow rate and the principle of fluid viscosity, to collect the floating oil directly in the water contained floating oil. For another example, CN101565942A has disclosed a marine, shovel type, floating oil collector, the main structure thereof consists of an air cushion, a balancing wing and a floating oil inlet control device. Floating oil enters through the oil inlet control device and passes a fine mesh, so as to filter impurity substances floating on the sea; the mixture entering the oil-water separating pool is subjected to an oil-water separating process by using the principle that floating oil and sea water have different densities. The floating oil being separated is floating on sea water, and the underlying seawater is discharged through an outlet; at this moment the oil pump is opened to collect floating oil and store it in a flexible oil bag. However, the method of current technology is poor in floating oil collection efficiency, thus is not suitable for large area of floating oil collection on sea.

BRIEF SUMMARY OF THE INVENTION

The invention overcomes the defects that the floating oil collecting device in the prior art is poor in floating oil collection efficiency and is not suitable for large area of floating oil collection on sea, and to provide an oil-water separating device and a floating oil collecting system comprising same which has high efficiency in floating oil collection and is suitable for large area of floating oil collection on sea.

The present invention provides an oil-water separating device. The device comprises an oil gathering chamber enclosed by a wall. At least a part of surface of the wall is covered with a porous, oleophilic and hydrophobic layer, which allows penetration of water and oil. The device also comprises a fixed layer covering on the surface of the porous, oleophilic and hydrophobic layer for limiting the flowing of the porous, oleophilic and hydrophobic layer, and the fixed layer allows the penetration of water and oil. The pore diameter of said porous, oleophilic and hydrophobic layer is 300-850 μm, the porosity is 10-40%.

The present invention also provides a floating oil collecting system, which comprises at least one oil-water separating device, wherein said oil-water separating device is just the oil-water separating device provided by the present invention.

In the oil-water separating device provided in the present invention, at least a part of the surface of the wall enclosing the oil gathering chamber is covered with a porous, oleophilic and hydrophobic layer. Therefore, after contacting with the oleophilic and hydrophobic layer, the floating oil can flow into the void among silican sands covered with oleophilic and hydrophobic membrane due to the small interface tension, and flow into the oil gathering chamber though the through-hole in the wall of the oil gathering chamber covered with the porous, oleophilic and hydrophobic layer, while after contacting with the oleophilic and hydrophobic layer, the water is substantially obstructed outside of the oleophilic and hydrophobic layer due to large interface tension thereof, or only small quantity of water can penetrate, or even no water penetrates at all. Therefore, the purpose of oil-water separating is obtained. More surprisingly, by using the floating oil collecting system comprising the oil-water separating device of the present invention, a large area of floating oil on sea can be collected effectively, and the floating oil collection efficiency can be improved significantly.

DETAILED DESCRIPTION OF THE INVENTION

Figure 1:
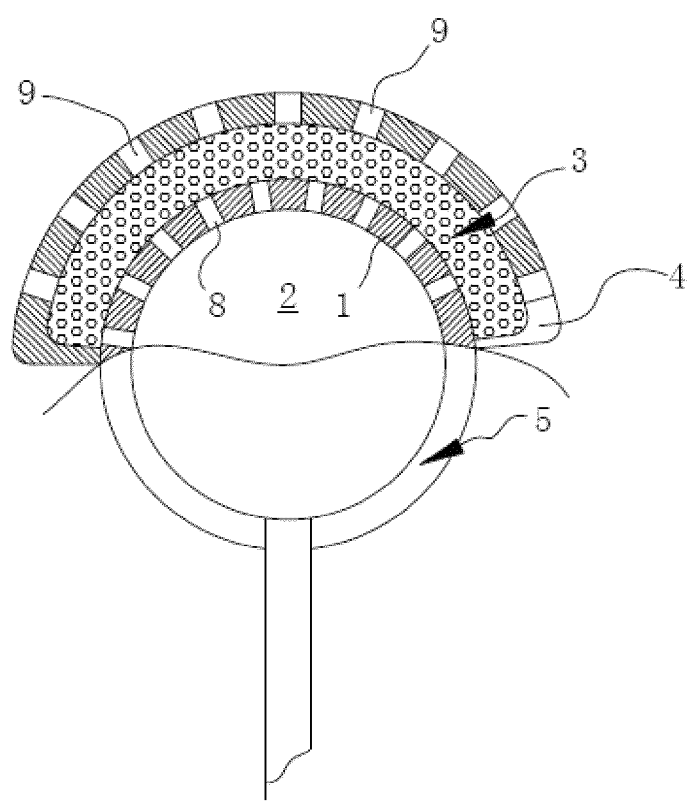
FIG. 1 is a schematic diagram showing the partial section view of the oil-water separating device according to the present invention.

According to the present invention, said oil-water separating device comprises an oil gathering chamber 2 enclosed with a wall 1. At least a part of the surface of the wall 1 is covered with a porous, oleophilic and hydrophobic layer 3, the portion of said wall 1 covered with the porous, oleophilic and hydrophobic layer 3 allows penetration of water and oil. The device also comprises a fixed layer 4 covering on or over the surface of the porous, oleophilic and hydrophobic layer 3 for limiting the flowing of the porous, oleophilic and hydrophobic layer, and the fixed layer 4 allows penetration of water and oil. The pore diameter of said porous, oleophilic and hydrophobic layer 3 is 300-850 μm, preferably 300-600 μm; the porosity is 10-40%, preferably 20-35%. Said pore diameter can be measured by an Electron Microscope. Said porosity can be measured by a mercury intrusion method. The detailed steps are as follows: press the mercury into the porous media to replace the air in the void; measure the mass difference of the sample before and after pressing the mercury, to obtain the void volume; divide the void volume by the appearance volume to obtain the porosity.

Using said oil-water separating device of the present invention, when the pressure difference of the oleophilic and hydrophobic layer is 0-20 kPa, the volume flow ratio of oil to water that are penetrating through the oleophilic and hydrophobic layer can reach 1.5-3:1.

As shown in FIG. 1, said oil-water separating device comprises an oil gathering chamber 2 enclosed with a wall 1. A part of the surface of the wall 1 is covered with a porous, oleophilic and hydrophobic layer 3, the portion of said wall 1 covered with the porous, oleophilic and hydrophobic layer 3 allows penetration of water and oil. The device also comprises a fixed layer 4 covering on the surface of the porous, oleophilic and hydrophobic layer 3 for limiting the flowing of the porous, oleophilic and hydrophobic layer, and the fixed layer 4 allows penetration of water and oil.

Preferably, for the purpose of enhancing the oil gathering efficiency, the entire surface of said wall 1 is covered with the porous, oleophilic and hydrophobic layer 3.

According to the present invention, said wall 1 enclosing the oil gathering chamber 2 and said fixed layer 4 may be of various shapes and materials (such as plastics) which allow penetration of water and oil to collect the floating oil and limit the flowing of said porous, oleophilic and hydrophobic layer. Preferably, the wall 1 and the fixed layer 4 are both plates. There are a plurality of means to allow penetration of water and oil. Preferably, the fixed layer 4 and the portion of said wall 1 covered with the porous, oleophilic and hydrophobic layer 3 have a plurality of through holes such that the fixed layer 4 and the portion of said wall 1 that is covered with the porous, oleophilic and hydrophobic layer 3 can allow penetration of water and oil via the through holes. Although the portion of said wall 1 covered with the porous, oleophilic and hydrophobic layer 3 allows penetration of water and oil, only the oil can pass through said porous, oleophilic and hydrophobic layer and said wall 1 easily and enter into the oil gathering chamber, but water penetration will be prevented or only small quantity of water can penetrate said porous, oleophilic and hydrophobic layer to reach the surface of the wall 1 and pass through the wall 1 into the oil gathering chamber, because the porous, oleophilic and hydrophobic layer has the oleophilic and hydrophobic property. In order to facilitate the water and oil penetrating the fixed layer smoothly and rapidly to contact with the porous, oleophilic and hydrophobic layer such that the oil can enter into the oil gathering chamber through the wall 1 rapidly, said through-holes are arranged uniformly on the fixed layer 4 and the portion of said wall 1 covered with the porous, oleophilic and hydrophobic layer 3. According to the embodiment mentioned-above, an oil-water separating chamber 5 is preferably formed between the wall 1 and the fixed layer 4. The porous, oleophilic and hydrophobic layer 3 is filled within the oil-water separating chamber 5 so as to further facilitate oil-water separating and oil gathering. Furthermore, the shape of the fixed layer may be formed according to the shape of the oil gathering chamber engaging therewith so that the oil-water separating chamber 5 has the shape engaging with the oil gathering chamber 2.

According to the present invention, the shape of the oil gathering chamber 2 may be of various shapes adapted to collect the floating oil on water surface, such as a sphere, a cylinder or a cone. The volume of the oil gathering chamber in the oil-water separating device may be selected according to the area of waters. Generally, the volume of the oil gathering chamber 2 may be 50-100 ml.

Figure 2:
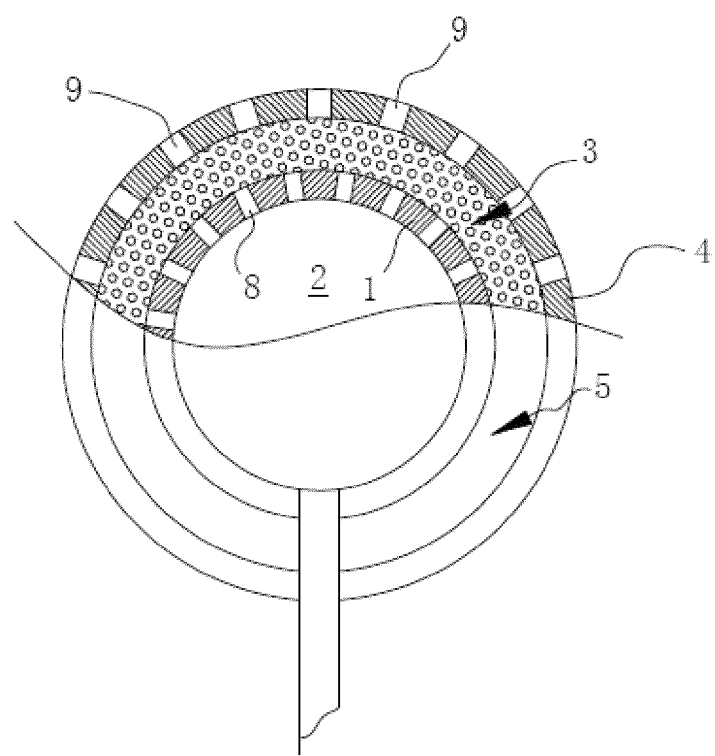
FIG. 2 is a schematic diagram showing the partial section view of the oil-water separating device according to the present invention.

As shown in FIG. 2, said oil-water separating device comprises an oil gathering chamber 2 enclosed with a wall 1. The entire surface of the wall 1 of the oil gathering chamber 2 is covered with a porous, oleophilic and hydrophobic layer 3, the wall 1 of the oil gathering chamber 2 covered with the porous, oleophilic and hydrophobic layer 3 has a plurality of through holes arranged uniformly. A fixed layer 4 is located on the surface of the porous, oleophilic and hydrophobic layer 3 for limiting the flowing of the porous, oleophilic and hydrophobic layer 3, and a plurality of through holes are arranged uniformly on the fixed layer 4. The wall 1 of the oil gathering chamber 2 and the fixed layer 4 together form a separating chamber 5.

According to the present invention, preferably, said oil-water separating device further comprises a pipe communicated with the oil gathering chamber 2. The floating oil stored in the oil gathering chamber 2 can be extracted and collected conveniently without salvaging this oil-water separating device in advance.

According to the present invention, said porous, oleophilic and hydrophobic layer 3 can be of various porous material layers with oleophilic and hydrophobic property. Preferably, in order to further improve the oil-water separation effect of filtering the floating oil, said oleophilic and hydrophobic layer 3 is an accumulation of precoated silicon sand. According to the present invention, said precoated silicon sand may be various precoated silicon sands with the oleophilic and hydrophobic property, which allow oil to flow into the voids among the precoated silicon sand and pass therethrough, while obstruct water outside of the precoated silicon sand. Preferably, said precoated silicon sand in the present application is the silicon sand with the surface coated with a coating layer. Said precoated silicon sand with the surface coated with a coating layer is formed by mixing and curing the silicon sand with the oleophilic and hydrophobic resin.

According to the present invention, said through holes in said wall 1 of the oil gathering chamber 2 covered with the porous, oleophilic and hydrophobic layer 3 and in the fixed layer 4 are arranged for the purpose of facilitating the floating oil entering into said oil-water separating device and finally into the oil gathering chamber 2. In order to prevent the precoated silicon sand from being taken along with the floating oil to penetrate said precoated silicon sand and flow into the oil gathering chamber 2 via the through holes of the oil gathering chamber, and prevent the precoated silicon sand from flowing out via the through holes on the fixed layer 4 to influence the oil-water separating effect, the pore diameter of the through-holes mentioned above (including the through-holes in the wall 1 of the oil gathering chamber 2 that is covered with the porous, oleophilic and hydrophobic layer and the through-holes in the fixed layer 4) is preferably no larger than, and more preferably, smaller than the average particle diameter of said precoated silicon sand. For example, the hole diameter of said through holes may be 100-400 μm.

The better the sphericity of said precoated silicon sand is, the more possible it is to ensure that the void diameter of the precoated silicon sand is smaller and uniform so as to further improve the oil penetration effect. Therefore, the sphericity of said precoated silicon sand may be more than 0.7, more preferably 0.7-0.95. Term "sphericity" means a measurement of relative sharpness or curvature of edges and corners of a particle, and it also means the degree of approaching a sphere of the particle. The method of measuring the sphericity is well known to the skilled person in this field. For example, a chart correction method can be used to measure it. The particle diameter of said precoated silicon sand may be 300-850 µm. The accumulation density may be 1.4-1.65%, preferably 1.4-1.5%.

According to the present invention, the thickness of said porous, oleophilic and hydrophobic layer 3 may be selected appropriately according to the amount of the floating oil on the water to be collected. If the floating oil layer is thinner, the thickness of the accumulation of the precoated silicon sand forming the porous, oleophilic and hydrophobic layer 3 is thinner, correspondingly. If the floating oil layer is thicker, the thickness of the accumulation of the precoated silicon sand forming the porous, oleophilic and hydrophobic layer 3 is thicker, correspondingly. Generally, the thickness of said porous, oleophilic and hydrophobic layer 3 may be 5-50 mm, preferably 10-30 mm.

According to the present invention, the selectable range of weight ratio of said oleophilic and hydrophobic resin to said silicon sand is relatively wide. Preferably the amount of the oleophilic and hydrophobic resin makes a coating layer with a thickness of 0.1-10 µm, more preferably 1-5 µm. Therefore, the mass ratio of the oleophilic and hydrophobic resin to the silicon sand may be 0.2-15:100.

According to the present invention, said oleophilic and hydrophobic resin may be various oleophilic and hydrophobic resins. Said oleophilic and hydrophobic resin preferably may be one or more resins selected from oleophilic and hydrophobic epoxy resin, oleophilic and hydrophobic phenolic resin, oleophilic and hydrophobic polyurethane resin, and oleophilic and hydrophobic silicon resin.

More preferably, when said oleophilic and hydrophobic resin is at least two resins selected from oleophilic and hydrophobic epoxy resin, oleophilic and hydrophobic phenolic resin, oleophilic and hydrophobic polyurethane resin, and oleophilic and hydrophobic silicon resin, a better oleophilic and hydrophobic property is obtained. Further preferably, the mass ratio between any two oleophilic and hydrophobic resins may be 1:0.1-10.

In particular, said oleophilic and hydrophobic epoxy resin may be one or more resins selected from glycidyl ether type epoxy resin, glycidyl ester type epoxy resin, glycidyl amine type epoxy resin, linear-aliphatic type epoxy resin, alicyclic type epoxy resin, polysulfide rubber modified epoxy resin, polyamide resin modified epoxy resin, polyvinyl tert-butyraldehyde modified epoxy resin, Nitrile rubber modified epoxy resin, phenolic resin modified epoxy resin, polyester resin modified epoxy resin, melamine urea formaldehyde resin modified epoxy resin, furfural resin modified epoxy resin, vinyl resin modified epoxy resin, isocyanate modified epoxy resin, and silicon resin modified epoxy resin.

Said oleophilic and hydrohobic phenolic resin may be one or two resins selected from dimethylbenzene modified phenolic resin, epoxy resin modified phenolic resin, and organosilicone modified phenolic resin.

Said oleophilic and hydrophobic polyurethane resin may be a polyurethane resin prepared by one or more selected from oligomeric polyols such as organic polyisocyanate, polyether, polyester and the like.

Said oleophilic and hydrophobic silicon resin may one or more selected from methyltrichlorosilane, dimethyldichlorosilance, phenyltrichlorosilane, diphenyldichlorosilane, and methylphenyl dichlorosilane.

According to the present invention, the method for curing the oleophilic and hydrophobic resin may be various common methods, such as curing by using a curing agent for curing or by photo-curing directly. The kinds of curing agent for curing may be various curing agents for curing the oleophilic and hydrophobic resin, which are well known to the skilled person in the art, and the range of the adjustable usage amount of the curing agent may be relatively wide. For example, the weight ratio of said curing agent to said oleophilic and hydrophobic resin may be 1-25:100.

The curing agent for said oleophilic and hydrophobic epoxy resin may be one or more selected from aliphatic amine, alicyclic amine, aromatic amine and its modification, polyamide, anhydride, tertiary amine and its salt, paraformaldehyde, imidazole, prepolymer, peroxide acyls, paraformaldehyde, and melamine resin.

The curing agent for said oleophilic and hydrophobic phenolic resin may be hexamethylenetetramine.

The curing agent for said oleophilic and hydrophobic polyurethane resin may be one or more selected from the addition product of toluene diisocyanate (TDI) and of trimethylolpropane (TMP), the prepolymer of toluene diisocyanate (TDI) and of Hydroxyl-containing components, and the tripolymer of single component moisture curing agent and of toluene diisocyanate (TDI).

The curing agent for said oleophilic and hydrophobic organic silicon resin may be dibutyltin dilaurate and/or N,N, N',N'-Tetramethyl guanidine.

According to the present invention, in order to further improve the oleophilic and hydrophobic property of the coating layer, the precoated silicon sand with the surface covered with a coating layer may be formed by mixing the silicon sand with the oleophilic and hydrophobic resin, the plasticizer and/or the lubricant, and then by curing the mixture thereof.

According to the present invention, the kinds and the usage amount of the plasticizer is well known for the skilled person in the art. The plasticizer is mainly used to reduce elasticity modulus and tensile breaking strength, to improve flexibility, reversible bending strength, toughness and impact strength, to reduce glass-transition temperature, to expand the applicability of the polymer at lower temperatures, to improve the bonding with various basic materials, and the like. The weight ratio of said plasticizer to said oleophilic and hydrophobic resin may be 5-25:100. Said plasticizer may be preferably one or more selected from phthalic acid ester, aliphatic acid ester, and phosphate ester. Said phthalic acidester may be dimethyl phthalate. Said aliphatic acid ester may be one or more selected from diglycol diformate, ethylene diformate and diethylene glycol diformate. Said phosphate ester may be one or more selected from triaryl phosphate, tri-isopropylated-phenyl phosphateeste (IPPP) and phenyl ether phosphate.

According to the present invention, the kinds and the usage amount of said lubricant are well known for the skilled person in the art. The lubricant is mainly used to improve lubricating property, to reduce friction and static electricity, and to improve surface gloss and appearance. The weight ratio of said lubricant to said oleophilic and hydrophobic resin may be 1-10:100. Said lubricant may be one or more selected from polyethylene wax, oxidized polyethlene wax, octadecanamide, calcium stearate, zinc stearate and ethylene bis stearamide.

According to the present invention, the conditions under which the silicon sand, the oleophilic and hydrophobic resin and the optional plasticizer and/or lubricant are mixed together and cured may be the common conditions in the art. For example, it can firstly heat the silicon sand particles to the temperature of 50-400□, preferably 100-240□; then mix the heated silicon sands with the oleophilic and hydrophobic resin, the optional plasticizer and/or lubricant, and stir the mixture uniformly. There are no special demands for the stirring temperature, as long as it allows said oleophilic and hydrophobic resin adhering to the surface of the silicon sand particles uniformly. The stirring time preferably is 1-10 minutes. The curing condition may be as follows: the curing temperature may be 20-150☐, the curing time may be 0.1-24 hours, and the curing humidity may be 5-35%.

The adding sequence of said oleophilic and hydrophobic resin, the plasticizer and the lubricant substantially has no influence on the property of precoated silicon sand obtained in the present invention. For example, the oleophilic and hydrophobic resin, the plasticizer, and the lubricant may be added at the same time, to be mixed with the silicon sand. Alternatively, the oleophilic and hydrophobic resin, the plasticizer, and the lubricant may be added in different steps. For example, the oleophilic and hydrophobic resin may firstly be mixed with the silicon sand, and then be mixed with the plasticizer and/or the lubricant.

Preferably, the precoated silicon sand may also be obtained by cooling, crushing and screening so as to control the particle diameter thereof. There are no special demands on the cooling conditions, but it's preferably cooled down to the room temperature. Furthermore, common methods for crushing and screening may be used to obtain the precoated silicon sand with the particle diameter according to the present invention.

The present invention further provides a floating oil collecting system. This system comprises at least one oil-water separating device which is just the oil-water separating device provided in the present invention.

Preferably, there may be a plurality of said oil-water separating devices, which preferably are positioned uniformly on the water surface containing floating oil so that the floating oil collection may be performed on the water surface with larger area, even on the sea surface, so as to enhance the collecting efficiency. A plurality of oil-water separating devices may be fixed by means of flexible connections. For example, the steel wire, the thin coiler and the thin rope may be used to connect the plurality of oil-water separating devices and to position them on the water surface, uniformly.

Preferably, said floating oil collecting system may further comprise a pump, and a pipe for connecting the pump and the oil gathering chamber of each oil-water separating device, so as to pump the collected floating oil at the same time.

Preferably, said floating oil collecting system may further comprise an oil gathering device so as to store the floating oil coming from the pump.

Preferably, said floating oil collecting system may further comprise a hull so as to accommodate the oil gathering device.

According to the present invention, the method for collecting the floating oil on the water surface by using said floating oil collecting system of the present invention may comprise the steps as follows: position said oil-water separating device according to the present invention on the water surface containing floating oil, so as to make at least part of the surface of the fixed layer 4, which covers on the surface of the porous, oleophilic and hydrophobic layer 3 for limiting the flowing of the porous, oleophilic and hydrophobic layer, contact with the water surface containing floating oil; and collect the floating oil within the oil gathering chamber.

According to the method in the present invention, said oil-water separating device is positioned on the water surface containing floating oil, and it needs to make at least part of, preferably 30%-80% of, surface of the fixed layer 4, which covers on the surface of the porous, oleophilic and hydrophobic layer 3 for limiting the flowing of the porous, oleophilic and hydrophobic layer, contact with the water surface containing floating oil, so that the oil-water enters into the oil-water separating chamber via the through holes on the fixed layer 4 and contacts with the porous, oleophilic and hydrophobic layer 3 therein, in order to achieve collecting the floating oil effectively. Preferably, the entire surface of said wall 1 is covered with the porous, oleophilic and hydrophobic layer 3. In order to absorbing the floating oil more effectively, it is preferable to make 30%-80% of the volume of said oil-water separating device (immersed) under the water surface containing floating oil.

The present invention has no special demands on the method for positioning the oil-water separating device on the water surface containing floating oil, and various common methods may be used. For example, said oil-water separating device may be floating on the water surface containing floating oil by using a buoyancy device, or said oil-water separating device may be hanging above the water surface containing floating oil.

Preferably, said method for collecting the floating oil on the water surface may further comprise importing the floating oil within each oil gathering chamber into a storage unit so as to store the floating oil. For example, the method for importing the floating oil within each oil gathering chamber into the storage unit comprises arranging a pipe communicated with each oil gathering chamber, and importing the floating oil within each oil gathering chamber into the storage unit through said pipe. In particular, the pipe communicated with each oil gathering chamber is connected with a pump. The floating oil is pumped from each oil gathering chamber and imported into the storage unit by said pump. Furthermore, this method may further comprise carrying away the storage unit loaded with the floating oil. For example, a hull may be used as the storage unit to facilitate the transportation.

Figure 3:
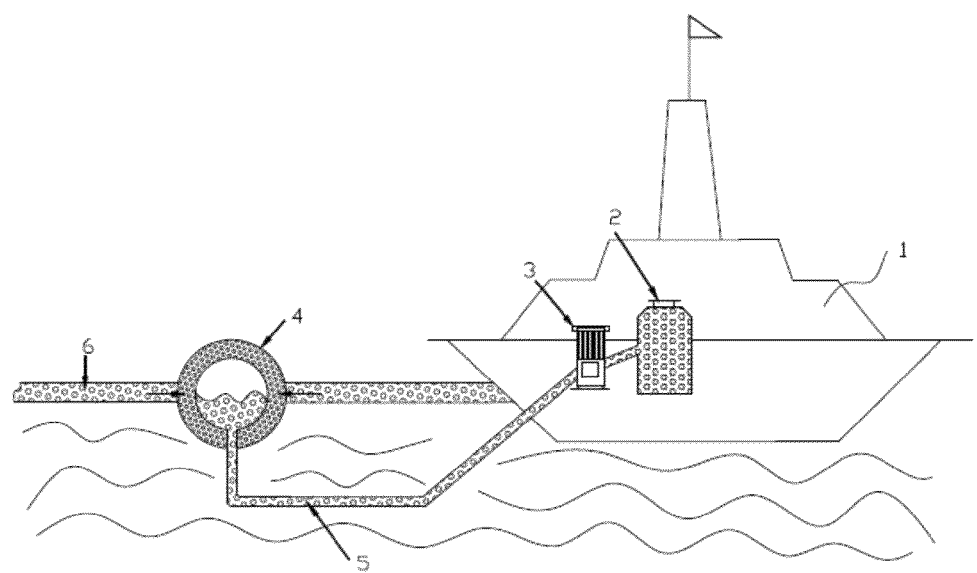
FIG. 3 is a schematic diagram of the floating oil collecting system according to the present invention.

Now referring to FIG. 3, the method for collecting the floating oil by using the floating oil collecting system according to the present invention is illustrated. Said floating oil collecting system comprises a hull 1, an oil gathering device 2 placed on the hull, a pump 3, a pipe 5 for connecting the pump 3 with an oil gathering chamber of the oil-water separating device 4. Said method for collecting the floating oil on the water surface comprises the step of positioning the oil-water separating device 4 on the water surface containing a floating oil layer 6, to make said oil-water separating device 4 floating on the water surface. Said oil-water separating device comprises an oil gathering chamber surrounded by a wall. The entire surface of the wall forming the oil gathering chamber is covered with the porous, oleophilic and hydrophobic layer (preferably 30-80% of the volume of said oil-water separating device is located under the water surface containing floating oil). A plurality of through holes are distributed uniformly on the wall of the oil gathering chamber covered with the porous, oleophilic and hydrophobic layer. A fixed layer is covered on the surface of the porous, oleophilic and hydrophobic layer for limiting the flowing of the porous, oleophilic and hydrophobic layer, and a plurality of throughholes are distributed uniformly on the fixed layer. The fixed layer and the wall of said oil gathering chamber forms a separating chamber. Said porous, oleophilic and hydrophobic layer is an accumulation of the precoated silicon sands, and is filled within the separating chamber. After a period of collecting, the pump 3 is actuated to collect the floating oil in the oil gathering chamber of the oil-water separating device 4 through the pipe 5, and the collected floating oil is stored in the oil gathering device 2.

The present invention will be further described in details in combination with particular embodiments.

In the following embodiments, the quartz sand may be commercially obtained from Yong Deng Blue Sky Quartz Sand Co., Ltd.

The manufactures and the brands for the oleophilic and hydrophobic resin, the curing agent and the plasticizer may be as follows:

Polyamide Resin Modified Epoxy Resin: Flagship Fine Chemicals Co., Ltd (Fuqing).

Polyvinyl tert-butyraldehyde Modified Epoxy Resin: Shengquan Chemcial Industry Co. Ltd (Shandong).

Dimethylbenzene Modified Epoxy Resin: Shengquan Chemcial Industry Co. Ltd (Shandong).

Organic Silicon Resin: Dow Corning (USA)

Polyurethane Resin: Shengquan Chemcial Industry Co. Ltd (Shandong).

Polytetrafluoroethylene: Qinairun Industry and Trade Co. Ltd (Shanghai).

Polydimethylsiloxane: Dow Corning (USA)

Aliphatic Amine as Curing Agent: Tianxing Thermal Insulation Materials Co., Ltd (Jiangyin).

Polyamide as Curing Agent: Flagship Fine Chemicals Co., Ltd (Fuqing).

Hexamethylenetetramine as Curing Agent: Tianxing Thermal Insulation Materials Co., Ltd (Jiangyin).

Ditin butyl dilaurate: Yuanji Chemical Industry Co. Ltd (Shanghai).

TDI Tripolymer: Bogao Coating Factory (Leliu Town, Shunde City)

Ddimethyl Phthalate (DMP) as Plasticizer: Liantai Chemcial Industry Co. Ltd (Shandong).

Polyethylene Wax as Lubricant: Huada Tianrong New Material Technology Co. Ltd (Beijing).

The methods for testing the oil absorption efficiency in the following embodiments make reference to "Technology Research on Oily Sludge Benzinum Extraction", Journal of Safety and Environment, Vol. 8, Stage 1, February, 2008.

The particular testing method is Soxhlet extraction-UV spectrophotometry.

The oil and its products have features of absorption in ultraviolet region. Aromatic compounds with benzene ring mainly absorb a wavelength of 250-260 nm Compounds with conjugated double bond mainly absorb a wavelength of 215-230 nm. In order to avoid interference of other factors, the ultraviolet absorption method often adopts a double-wavelength measurement. Generally, two main absorption wavelengths of crude oil are 225 nm and 254 nm. As oil products, the absorption peak of fuel oil, lubricating oil and the like is close to that of crude oil. Therefore, the wavelength selection should be depending on the actual case. A wavelength of 254 nm may be selected for crude oil and heavy oil, while a wavelength of 225 nm may be selected for light oil and oils from oil refinery.

Soxhlet extraction-UV spectrophotometry uses Soxhlet extractor to extract the crude oil from the oily sludge by circulating reflux for six hours. Benzinum or mixed heptane is usually used as the extracting agent. The oil content is measured through double-wavelength by using an ultraviolet spectrophotometer.

Solution Preparation (1) Standard Oil: the oils are extracted from the oily sludge sample by using benzinum with a temperature of 30-60□ which has subjected to de-aromatization and re-distillation; the oils are then filtered after dehydration by anhydrous sodium sulfate. The filtered liquids are placed within a calorstat with a temperature of 65□, so as to remove the remaining benzinum, then the standard oil is obtained.

(2) Standard Oil Stock Solution: 0.1 gram of standard oils weighted accurately are dissolved in benzinum, the mixed solution is transferred to a 100 ml volumetric flask and diluted to reach marking line, then stored in a refrigerator. This solution contains oil at 1.00 milligram oil per milliliter.

(3) Standard Oil Usage Solution: said standard oil stock solution mentioned-above is diluted with benzinum by 10 times, this diluted solution contains oil at 0.1 milligram per milliliter.

(4) De-aromatic benzinum (fraction at 60-90□).

Preparation for de-aromatic benzinum: microballoon silica gel with a particle diameter of 60-100 mesh and neutral chromatography aluminum oxide with a particle diameter of 70-120 mesh (activation at 150-160□ for 4 hours) are put into a glass column with an inner diameter of 25 mm and a height of 750 mm, by using Column Chromatography, before completely cooling. The lower layer of the silica gel has a height of 600 mm, and aluminum oxide with a thickness of 50 mm is covered thereon; then a de-aromatization is performed for the benzinum (fraction at 60-90□) sold in the market through this column. Benzinum is collected in a narrow-necked bottle. Water is used to be a reference for measuring the transmittance of the treated Benzinum, which is no less than 80%, at a position corresponding to the marking line of 225 nm on an ultraviolet spectrophotometer.

Standard Curve Plotting

Standard oil usage solutions with a volume of 0, 2.00, 4.00, 8.00, 12.00, 20.00 and 25.00 ml are respectively added into seven measuring flasks with a volume of 70 ml, and diluted to reach the marking line by using benzinum (60-90□). At a position corresponding to a marking line of 254 nm on the ultraviolet spectrophotometer, a 1 cm quartz cuvette is used as reference for measuring an absorbance, and upon which plotting a standard curve.

Measurement on Oily Sludge Sample (1) 20 grams of oily sludge sample pre-dehydrated at 105° C. is packaged by a filter paper, and then put into a soxhlet extractor; Benzinum is added into a round bottomed flask at ½-⅓ volume thereof, and a reflux condensing is performed for six hours.

(2) The remaining substance is dissolved with de-aromatic benzinum, and then this mixed solution is transferred to a 100 ml measuring flask for diluting to constant volume; the absorbance of the oily sludge sample is measured under the same condition as that of the standard sample.

(3) The oil content can be found out on the standard curve, by which the oil content can be calculated.

Preparation Embodiment 1

This embodiment is used to describe the preparation of the precoated silicon sand with its surface covered with an oleophilic and hydrophobic film provided in the present invention.

After being heated to 250° C., 3 kg of quartz sand particles (with a density of 1.65 g/cm$^3$) with an average diameter of 0.4 mm is put into a sand mixer for stirring, followed by cooled down to 200° C.; 0.15 kg of polyamide resin modified epoxy resin is added therein to stir sufficiently so as to make the resin being distributed on the outer surface of the quarts sand particle uniformly; then Aliphatic Amine (with a weight ratio 2:100 of the curing agent to the resin) is added as curing agent for curing, and the cured particles are finally cooled down to a room temperature and crushed to obtain the precoated silicon sand (the thickness of a coating layer is 1-2 micrometer). The sphericity of the obtained, precoated silicon sand is 0.72 and the particle diameter distribution is 320-450 micrometer.

Preparation Embodiment 2

This embodiment is used to describe the preparation of the precoated silicon sand with its surface covered with an oleophilic and hydrophobic film provided in the present invention.

The precoated particles are prepared by the same method as that of Preparation Embodiment 1, expect for that dimethyl phthalate (DMP) is added as a plasticizer before adding the curing agent. The weight ratio of the plasticizer to the resin is 10:100. After being stirred sufficiently, the thickness of the coating layer of the obtained precoated silicon sand is 2-3 micrometer. The sphericity of the precoated silicon sand is 0.75 and the particle diameter distribution is 350-430 micrometer.

Preparation Embodiment 3

This embodiment is used to describe the preparation of the precoated silicon sand with its surface covered with an oleophilic and hydrophobic film provided in the present invention.

The precoated particles are prepared by the same method as that of Preparation Embodiment 1, expect for that polyethylene wax is added as a lubricant before the resin begins to cure and cluster. The weight ratio of the lubricant to the resin is 2:100. After stirred sufficiently, the thickness of the coating layer of the obtained precoated silicon sand is 0.5-1 micrometer. The sphericity of the precoated silicon sand is 0.78 and the particle diameter distribution is 380-420 micrometer.

Preparation Embodiment 4

This embodiment is used to describe the preparation of the precoated silicon sand with its surface covered with an oleophilic and hydrophobic film provided in the present invention.

The precoated particles are prepared by the same method as that of Preparation Embodiment 1, expect for that the weight ratio of the polyamide resin modified epoxy resin to the quarts sand particle is 0.5:100. The thickness of the coating layer of the obtained precoated silicon sand is 0.1-0.5 micrometer. The sphericity of the precoated silicon sand is 0.73 and the particle diameter is 350-430 micrometer.

Preparation Embodiment 5

This embodiment is used to describe the preparation of the precoated silicon sand with its surface covered with an oleophilic and hydrophobic film provided in the present invention.

The precoated particles are prepared by the same method as that of Preparation Embodiment 1, expect for that the weight ratio of the polyamide resin modified epoxy resin to the quarts sand particle is 12:100. The thickness of the coating layer of the obtained precoated silicon sand is 4-5 micrometer. The sphericity of the precoated silicon sand is 0.75 and the particle diameter is 360-450 micrometer.

Preparation Embodiment 6

This embodiment is used to describe the preparation of the precoated silicon sand with its surface covered with an oleophilic and hydrophobic film provided in the present invention.

2 kg of quartz sand particles with an average diameter of 0.4 mm are heated to 400° C., 0.04 kg of polyvinyl tert-butyraldehyde modified epoxy resin is added therein to stir sufficiently, so as to make the resin being distributed on the outer surface of the quarts sand particles uniformly; then polyamide resin (with a weight ratio 5:100 of the curing agent to the resin) is added as curing agent for curing, to make the surface of the quarts sand particle covered with a coating layer of resin; followed by cooled down to a room temperature, crushed and screened to obtain the precoated silicon sand (the thickness of coating layer is 1-2 micrometer). The sphericity of the obtained precoated silicon sand is 0.75 and the particle diameter is 320-450 micrometer.

Preparation Embodiment 7

This embodiment is used to describe the preparation of the precoated silicon sand with its surface covered with an oleophilic and hydrophobic film provided in the present invention.

5 kg of silicon sands with an average diameter of 0.8 mm are heated to 100□, then 0.3 kg of dimethylbenzene modified phenolic resin is added therein together with hexamethylene-tetramine as curing agent (with a weight ratio 12:100 of the curing agent to the resin) to stir sufficiently, so as to make the resin and the curing agent being distributed on the outer surface of the silicon sand uniformly; followed by cooled down to a room temperature, crushed and screened to obtain the oleophilic and hydrophobic precoated particles. The thickness of the coating layer of the obtained precoated silicon sand is 5-6 micrometer. The sphericity of the precoated silicon sand is 0.72 and the particle diameter is 750-825 micrometer.

Preparation Embodiment 8

This embodiment is used to describe the preparation of the precoated silicon sand with its surface covered with an oleophilic and hydrophobic film provided in the present invention.

The precoated particles are prepared by the same method as that of Preparation Embodiment 1, expect for that organic silicon resin is used instead of polyamide resin modified epoxy resin, and for that dibutyltin dilaurate is used as a curing agent. The thickness of the coating layer of the obtained precoated silicon sand is 1-2 micrometer. The sphericity of the precoated silicon sand is 0.75 and the particle diameter is 320-450 micrometer.

Preparation Embodiment 9

This embodiment is used to describe the preparation of the precoated silicon sand with its surface covered with an oleophilic and hydrophobic film provided in the present invention.

The precoated particles are prepared by the same method as that of Preparation Embodiment 1, expect for that polyurethane resin is used instead of polyamide resin modified epoxy resin, and for that TDI Tripolymer is used as a curing agent. The thickness of the coating layer of the obtained precoated silicon sand is 1-2 micrometer. The sphericity of the precoated silicon sand is 0.73 and the particle diameter is 320-450 micrometer.

Preparation Embodiment 10

This embodiment is used to describe the preparation of the precoated silicon sand with its surface covered with an oleophilic and hydrophobic film provided in the present invention.

The precoated particles are prepared by the same method as that of Preparation Embodiment 1, expect for that polytetrafluoroethylene is used instead of polyamide resin modified epoxy resin, and for that no curing agent is used. The thickness of the coating layer of the obtained precoated silicon sand is 1-2 micrometer. The sphericity of the precoated silicon sand is 0.71 and the particle diameter is 320-450 micrometer.

Preparation Embodiment 11

This embodiment is used to describe the preparation of the precoated silicon sand with its surface covered with an oleophilic and hydrophobic film provided in the present invention.

The precoated particles are prepared by the same method as that of Preparation Embodiment 1, expect for that polydimethylsiloxane is used instead of polyamide resin modified epoxy resin, and for that no curing agent is used. The thickness of the coating layer of the obtained precoated silicon sand is 1-2 micrometer. The sphericity of the precoated silicon sand is 0.73 and the particle diameter is 320-450 micrometer.

Preparation Embodiment 12

This embodiment is used to describe the preparation of the precoated silicon sand with its surface covered with an oleophilic and hydrophobic film provided in the present invention.

The precoated particles are prepared by the same method as that of Preparation Embodiment 1, expect for that 2 kg of polyamide resin modified epoxy resin and 1 kg of polyvinyl tert-butyraldehyde modified epoxy resin are used instead of 3 kg of polyamide resin modified epoxy resin. The thickness of the coating layer of the obtained precoated silicon sand is 1-2 micrometer. The sphericity of the precoated silicon sand is 0.75 and the particle diameter is 320-450 micrometer.

Preparation Embodiment 13

This embodiment is used to describe the preparation of the precoated silicon sand with its surface covered with an oleophilic and hydrophobic film provided in the present invention.

The precoated particles are prepared by the same method as that of Preparation Embodiment 1, expect for that 0.5 kg of polyvinyl tert-butyraldehyde modified epoxy resin and 2.5 kg of dimethylbenzeneare modified phenolic resin are used instead of polyamide resin modified epoxy resin, and for that polyamide (with a weight ratio 5:100 of the polyamide to the polyvinyl tert-butyraldehyde modified epoxy resin) and hexamethylenetetramine (with a weight ratio 5:100 of the hexamethylenetetramine to the dimethylbenzene modified phenolic resin) are used as curing agents. The thickness of the coating layer of the obtained precoated silicon sand is 1-2 micrometer. The sphericity of the precoated silicon sand is 0.78 and the particle diameter is 320-450 micrometer.

Preparation Embodiment 14

This embodiment is used to describe the preparation of the precoated silicon sand with its surface covered with an oleophilic and hydrophobic film provided in the present invention.

The precoated particles are prepared by the same method as that of Preparation Embodiment 1, expect for that 0.5 kg of polyvinyl tert-butyraldehyde modified epoxy resin, 1.5 kg of dimethylbenzene modified phenolic resin and 1 kg of organic silicon resin are used instead of polyamide resin modified epoxy resin, and for that polyamide (with a weight ratio 5:100 of the polyamide to the polyvinyl tert-butyraldehyde modified epoxy resin), hexamethylenetetramine (with a weight ratio 5:100 of the hexamethylenetetramine to the dimethylbenzene modified phenolic resin) and Dibutyltin dilaurate (with a weight ratio 5:100 of the Dibutyltin dilaurate to the organic silicon resin) are used as curing agents. The thickness of the coating layer of the obtained precoated silicon sand is 1-2 micrometer. The sphericity of the precoated silicon sand is 0.82 and the particle diameter is 320-450 micrometer.

Preparation Embodiment 15

This embodiment is used to describe the preparation of the precoated silicon sand with its surface covered with an oleophilic and hydrophobic film provided in the present invention.

The precoated particles are prepared by the same method as that of Preparation Embodiment 1, expect for that 1.5 kg of polyvinyl tert-butyraldehyde modified epoxy resin and 1.5 kg of polyurethane resin are used instead of polyamide resin modified epoxy resin, and for that polyamide (with a weight ratio 5:100 of the polyamide to the polyvinyl tert-butyraldehyde modified epoxy resin) and TDI Tripolymer (with a weight ratio 5:100 of the TDI Tripolymer to the polyurethane resin) are used as curing agents. The thickness of the coating layer of the obtained precoated silicon sand is 1-2 micrometer. The sphericity of the precoated silicon sand is 0.78 and the particle diameter is 320-450 micrometer.

Embodiment 1-15

This embodiment is used to illustrate the preparation of the oil-water separating device provided in the present invention.

Positioning a spherical oil gathering chamber with a volume of 50 ml (it is formed of PC polycarbonate material, and an oil port communicated with pipes is opened at the top of the oil gathering chamber) within another spherical chamber (it is formed of polycarbonate material); and filling precoated silicon sands (about 30 ml) prepared according to Preparation Embodiments 1-15 between the wall of the oil gathering chamber and the wall of another spherical chamber, to form a porous, oleophilic and hydrophobic layer; the wall of said another spherical chamber is used to fix the precoated silicon sands filled therebetween, to make said porous, oleophilic and hydrophobic layer covering the wall of said oil gathering chamber; the wall of said oil gathering chamber and the wall of another spherical chamber both have a plurality of through-holes distributed uniformly. The thickness of said porous, oleophilic and hydrophobic layer, the hole diameter of the walls of said oil gathering chamber and another spherical chamber, as well as the porosity, the hole diameter and the accumulation density of said porous, oleophilic and hydrophobic layer are shown in Table one below.

The floating oil collecting system is used to collect the floating oil on the water surface. Said floating oil collecting system comprises a hull, an oil gathering device placed on the hull, a pump, and a pipe for connecting the pump with an oil gathering chamber of the oil-water separating device. Said method for collecting the floating oil on the water surface comprises the following steps: connecting 20 oil-water separating devices provided in the embodiment mentioned-above by using steel wires; positioning said oil-water separating devices on the water surface containing floating oil layer (each oil-water separating device is spaced apart by 15-20 cm with each other, 40-50% of the volume of each oil-water separating device is under the water surface containing floating oil) (the floating oil is floating on the water surface at 1 liter per square meter, and the density of the floating oil is 0.7-0.8 g/cm$^3$); actuating the pump after collecting for 2.5 hours, and delivering the floating oil collected in the oil gathering chamber of the oil-water separating device to the oil gathering device and storing therein; the oil absorption rate is shown in Table One.

Embodiment Sixteen

The present embodiment is used to illustrate the preparation of the oil-water separating device provided in the present invention.

A cubic body with a volume of 100 ml is used as the oil gathering chamber (it is formed of PC polycarbonate material, and an oil port communicated with a pipe is opened at the side of the oil gathering chamber), the precoated silicon sands prepared according to Embodiment One are covered on a part of the surface of the oil gathering chamber to form the porous, oleophilic and hydrophobic layer. The porosity of the porous, oleophilic and hydrophobic layer is 35%, the hole diameter is 480 micrometer, the accumulation density is 1.48 g/cm$^3$, and the thickness is 30 mm; a fixed layer is formed on the surface of said porous, oleophilic and hydrophobic layer for limiting the flowing of said porous, oleophilic and hydrophobic layer, and a plurality of through holes (the hole diameter is 300 micrometer) are distributed on the fixed layer uniformly; the upper surface of said oil gathering chamber and the fixed layer together form an oil-water separating chamber, the porous, oleophilic and hydrophobic layer is filled within said oil-water separating chamber (the filling volume of the pre-coated silicon sand is about 30 ml). The wall of the upper surface of said oil gathering chamber has a plurality of through holes (the diameter of the through hole is 300 micrometer). The floating oil is collected according to the method of Embodiments 1-15, except for that 80% of the surface of the fixed layer covering the surface of the porous, oleophilic and hydrophobic layer for limiting the flowing of the porous, oleophilic and hydrophobic layer is contacting with the water surface containing floating oil; the oil absorption rate is shown in Table One.

surface of the wall is covered with a porous, oleophilic and hydrophobic layer, which obstructs penetration of water and allows penetration of oil; the device also comprises a fixed layer covering on a surface of the porous, oleophilic and hydrophobic layer for limiting the flowing of the porous, oleophilic and hydrophobic layer, and the fixed layer allows penetration of water and oil; a pore diameter of said porous, oleophilic and hydrophobic layer is 300-850 µm, and a porosity is 10-40%; wherein, an entire surface of the wall is covered with the porous, oleophilic and hydrophobic layer; wherein, the wall and the fixed layer comprise a plurality of through holes, an oil-water separating chamber is formed between the wall and the fixed layer, and the porous, oleophilic and hydrophobic layer is filled within the oil-water separating chamber; and wherein the oleophilic and hydrophobic layer is an accumulation of precoated silicon sands; a sphericity of the precoated silicon sand is more than 0.7, a particle diameter is 300-850 µm, and an accumulation density is 1.4-1.65 g/cm$^3$; the precoated silicon sand is silicon sand with a surface covered with a coating layer, and the precoated silicon sand is formed by mixing the silicon sand and an oleophilic and hydrophobic resin and by being cured; a diameter of said through holes is no larger than the particle diameter of the precoated silicon sand; and a thickness of the coating layer is 0.1-10 µm.

TABLE ONE

| Embodiment No. | Thickness of the porous, oleophilic and hydrophobic layer (mm) | Diameter of the through hole (mm) | Porosity of the porous, oleophilic and hydrophobic layer (%) | Diameter of the porous, oleophilic and hydrophobic layer(mm) | Accumulation density of the porous, oleophilic and hydrophobic layer (g/cm$^3$) | Oil of absorption rate (%) |
|---|---|---|---|---|---|---|
| Embodiment 1 | 20 | 0.3 | 20 | 0.45 | 1.56 | 60 |
| Embodiment 2 | 20 | 0.3 | 25 | 0.48 | 1.58 | 65 |
| Embodiment 3 | 20 | 0.3 | 30 | 0.52 | 1.57 | 67 |
| Embodiment 4 | 20 | 0.3 | 22 | 0.46 | 1.60 | 62 |
| Embodiment 5 | 20 | 0.3 | 21 | 0.45 | 1.48 | 61 |
| Embodiment 6 | 20 | 0.3 | 25 | 0.48 | 1.59 | 62 |
| Embodiment 7 | 20 | 0.3 | 20 | 0.47 | 1.53 | 75 |
| Embodiment 8 | 20 | 0.3 | 28 | 0.55 | 1.56 | 65 |
| Embodiment 9 | 20 | 0.3 | 26 | 0.50 | 1.55 | 70 |
| Embodiment 10 | 20 | 0.3 | 20 | 0.47 | 1.53 | 72 |
| Embodiment 11 | 20 | 0.3 | 20 | 0.44 | 1.55 | 70 |
| Embodiment 12 | 20 | 0.3 | 35 | 0.58 | 1.52 | 82 |
| Embodiment 13 | 20 | 0.3 | 32 | 0.56 | 1.53 | 81 |
| Embodiment 14 | 20 | 0.3 | 38 | 0.58 | 1.58 | 85 |
| Embodiment 15 | 20 | 0.3 | 31 | 0.56 | 1.55 | 80 |
| Embodiment 16 | 30 | 0.3 | 35 | 0.48 | 1.48 | 78 |

(As the pressure difference of the porous, oleophilic and hydrophobic layer is within 0-20 kPa, the ratio of the volume flow rate of oil to water that is penetrating the porous, oleophilic and hydrophobic layer is 1.5-3:1).

The oil absorption rate is the percentage of oil in the oil-water mixture collected in the oil gathering chamber. The oil absorption is mainly presented by the ability of oil permeability and water resist of the oleophilic and hydrophobic layer in said oil collecting device according to the present invention; the better the effect of oil permeability and water resist of the oleophilic and hydrophobic layer is, the higher the absorption rate is.

After absorbing the floating oil for 2.5 hours according to the method of Embodiments 1-15, the remaining contents of the floating oil per square meter is only 1-2% of the volume of the floating oil on the water surface before collecting. After absorbing the floating oil for 2.5 hours according to the method of Embodiment 16, the remaining contents of the floating oil per square meter is only 2% of the volume of the floating oil on the water surface before collecting.

What is claimed is:

1. An oil-water separating device, comprising an oil gathering chamber enclosed by a wall; at least a part of the a 2. The oil-water separating device according to claim 1, wherein, the wall and the fixed layer are both plates; the fixed layer and the a portion of said wall covered with the porous, oleophilic and hydrophobic layer have a plurality of said through holes such that the fixed layer and the portion of said wall covered with the porous, oleophilic and hydrophobic layer allow penetration of water and oil via the through the holes in the fixed layer and oil is allowed to pass through the holes in the said portion of the wall.

3. The oil-water separating device according to claim 2, wherein, the through holes are distributed uniformly on the fixed layer and on the portion of said wall covered with the porous, oleophilic and hydrophobic layer.

4. The oil-water separating device according to claim 1, wherein, the thickness of the oleophilic and hydrophobic layer is 5-50 mm, the sphericity of the precoated silicon sand is 0.7-0.95, and the accumulation density is 1.4-1.5 g/cm$^3$.

5. The oil-water separating device according to claim 1, wherein, a weight ratio of the oleophilic and hydrophobic resin to the silicon sand is 0.2-15:100; the oleophilic and hydrophobic resin comprises at least one of oleophilic and hydrophobic epoxy resin, oleophilic and hydrophobic phenolic resin, oleophilic and hydrophobic polyurethane resin, and oleophilic and hydrophobic silicon resin.

6. The oil-water separating device according to claim 5, wherein, the oleophilic and hydrophobic epoxy resin comprises at least one of glycidyl ethers type epoxy resin, glycidyl ester type epoxy resin, glycidyl amine type epoxy resin, linear-aliphatic type epoxy resin, alicyclic type epoxy resin, polysulfide rubber modified epoxy resin, polyamide resin modified epoxy resin, polyvinyl tert-butyraldehyde modified epoxy resin, nitrile rubber modifying epoxy resin, phenolic resin modified epoxy resin, polyester resin modified epoxy resin, melamine urea formaldehyde resin modified epoxy resin, furfural resin modified epoxy resin, vinyl resin modified epoxy resin, isocyanate modified epoxy resin, and silicon resin modified epoxy resin.

7. The oil-water separating device according to claim 5, wherein, the oleophilic and hydrophobic phenolic resin comprises at least one of dimethylbenzene modified phenolic resin, epoxy resin modified phenolic resin, and organosilicone modified phenolic resin.

8. The oil-water separating device according to claim 5, wherein, the oleophilic and hydrophobic polyurethane resin is prepared by from at least one of organic polyisocyanate, polyether and oligomeric polyols.

9. The oil-water separating device according to claim 5, wherein, the oleophilic and hydrophobic silicon resin comprises at least one of methyltrichlorosilane, dimethyldichlorosilance, phenyltrichlorosilane, diphenyldichlorosilane, and methylphenyl dichlorosilane.

10. The oil-water separating device according to claim 1, wherein, the a weight ratio of the a curing agent for curing to the oleophilic and hydrophobic resin is 1-25:100.

* * * * *